(12) United States Patent
Furukawa

(10) Patent No.: US 11,047,767 B2
(45) Date of Patent: Jun. 29, 2021

(54) OPTICAL FIBER CHARACTERISTIC MEASUREMENT DEVICE AND OPTICAL FIBER CHARACTERISTIC MEASUREMENT METHOD

(71) Applicant: YOKOGAWA ELECTRIC CORPORATION, Tokyo (JP)

(72) Inventor: Osamu Furukawa, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/654,264

(22) Filed: Oct. 16, 2019

(65) Prior Publication Data
US 2020/0124497 A1 Apr. 23, 2020

(30) Foreign Application Priority Data
Oct. 17, 2018 (JP) .............................. JP2018-195645

(51) Int. Cl.
*G01N 21/00* (2006.01)
*G01M 11/00* (2006.01)
*G01M 11/02* (2006.01)

(52) U.S. Cl.
CPC ...... *G01M 11/319* (2013.01); *G01M 11/0207* (2013.01)

(58) Field of Classification Search
CPC ........... G01M 11/3109; G01M 11/338; G01M 11/3145; G01M 11/335; G01M 11/33
USPC ....................................................... 356/73.1
See application file for complete search history.

(56) References Cited

U.S. PATENT DOCUMENTS

| 2010/0225900 | A1  |  9/2010 | Hotate et al. |
| 2011/0058778 | A1* |  3/2011 | Herbst ................ G02B 6/4484 385/100 |
| 2013/0043886 | A1* |  2/2013 | Mase ................... A61B 5/0507 324/642 |
| 2016/0273999 | A1* |  9/2016 | Hotate .................... G01M 11/39 |
| 2017/0307474 | A1* | 10/2017 | Thevenaz .......... G01M 11/3181 |

FOREIGN PATENT DOCUMENTS

| JP | H05-164696 A | 6/1993 |
| JP | H11-311647 A | 11/1999 |
| JP | 2008-32616 A | 2/2008 |
| JP | 5105302 B2 | 12/2012 |
| JP | 2016-42005 A | 3/2016 |

OTHER PUBLICATIONS

Office Action issued in the counterpart Chinese Patent Application No. 201910988281.9, dated Apr. 22, 2021 (10 pages).

* cited by examiner

*Primary Examiner* — Md M Rahman
(74) *Attorney, Agent, or Firm* — Osha Bergman Watanabe & Burton LLP

(57) ABSTRACT

An optical fiber characteristic measurement device includes: a detector that detects Brillouin scattered light obtained by causing light to be incident on an optical fiber under test; a spectrum analyzer that obtains a Brillouin gain spectrum from the Brillouin scattered light; and a spectrum analyzing controller that: measures a characteristic of the optical fiber under test by analyzing the Brillouin gain spectrum to obtain a peak frequency of the Brillouin gain spectrum, and changes a frequency range used by the spectrum analyzer to obtain the Brillouin gain spectrum according to the peak frequency.

10 Claims, 8 Drawing Sheets

OPTICAL FIBER CHARACTERISTIC MEASUREMENT DEVICE AND OPTICAL FIBER CHARACTERISTIC MEASUREMENT METHOD

TECHNICAL FIELD

The present invention relates to an optical fiber characteristic measurement device and an optical fiber characteristic measurement method.

BACKGROUND

An optical fiber characteristic measurement device is a device that measures a temperature distribution, a strain distribution, or other characteristics in a length direction of an optical fiber under test by causing continuous light or pulse light to be incident on the optical fiber under test and detecting scattered light or reflected light arising in the optical fiber under test. In this optical fiber characteristic measurement device, because the detected scattered light or reflected light changes according to a physical quantity (such as a temperature or a strain) affecting the optical fiber under test, the optical fiber under test per se are used as a sensor.

One type of optical fiber characteristic measurement device is a BOCDR (Brillouin optical correlation domain reflectometry) device. This BOCDR optical fiber characteristic measurement device causes pump light that is frequency-modulated continuous light to be incident from one end of the optical fiber under test and detects interference between Brillouin scattered light emitted from one end of the optical fiber under test and reference light (light subjected to same frequency modulation as the pump light). Then, from an obtained detection signal, a spectrum of the Brillouin scattered light ("Brillouin gain spectrum") is obtained, and the characteristics of the optical fiber under test are measured by seeking a frequency shift amount of the Brillouin scattered light relative to the incident light ("Brillouin frequency shift").

By causing the Brillouin scattered light and the reference light to interfere, the BOCDR optical fiber characteristic measurement device selectively extracts the Brillouin scattered light at a specific position in the optical fiber under test where "correlation peaks" appear. Here, intervals of the correlation peak in the optical fiber under test are inversely proportional to modulation frequencies of the pump light and the reference light. Moreover, by sweeping the modulation frequencies of the pump light and the reference light, the correlation peaks can be moved along the length direction of the optical fiber under test. As such, by seeking the Brillouin frequency shift at the position where each correlation peak appears while moving the correlation peak, the temperature distribution or the strain distribution in the length direction of the optical fiber under test can be measured. For details of the BOCDR optical fiber characteristic measurement device, see, for example, patent literature 1 below.

PATENT LITERATURE

[Patent Literature 1] JP 5105302 B2

Now, in the above BOCDR optical fiber characteristic measurement device, to measure an entirety of the length direction of the optical fiber under test at a high spatial resolution or to widen a measurable temperature or strain range (measurement dynamic range) without degrading measurement precision, it is necessary to increase a number of measurement points. However, BOCDR optical fiber characteristic measurement devices have a measurement time becoming longer as the number of measurement points increases.

SUMMARY

One or more embodiments of the present invention provides an optical fiber characteristic measurement device and an optical fiber characteristic measurement method that can measure characteristics of an optical fiber under test in a shorter time without increasing a number of measurement points.

An optical fiber characteristic measurement device (1) according to one or more embodiments of the present invention is provided with a detection unit (detector) (16) that detects Brillouin scattered light (LS) obtained by causing pump light (LP) to be incident on optical fiber under test (FUT), a spectrum acquisition unit (e.g., a spectrum analyzer) (17) that obtains a Brillouin gain spectrum that is a spectrum of the Brillouin scattered light from a detection signal (S1) output from the detection unit, and a spectrum analysis unit (e.g., a spectrum analyzing controller, a personal computer, a personal device, etc.) (18) that measures a characteristic of the optical fiber under test by analyzing the Brillouin gain spectrum obtained by the spectrum acquisition unit to seek a Brillouin frequency shift and changes a frequency range of obtaining the Brillouin gain spectrum by the spectrum acquisition unit according to a peak frequency obtained by analyzing the Brillouin gain spectrum.

Furthermore, in an optical fiber characteristic measurement device of one or more embodiments of the present invention, the spectrum analysis unit predicts a peak frequency likely to be obtained (a possible peak frequency) next time (i.e., obtained during a subsequent measurement) based on the peak frequency obtained by analyzing the Brillouin gain spectrum and changes the frequency range based on this prediction result.

Furthermore, in an optical fiber characteristic measurement device of one or more embodiments of the present invention, the spectrum analysis unit is provided with a computation unit (e.g., a processor) (31) that predicts the peak frequency likely to be obtained next time using a learning model (LM) obtained by performing machine learning using data indicating change over time in the peak frequency obtained by analyzing the Brillouin gain spectrum or data indicating change over time in the Brillouin gain spectrum and a setting control unit (setting controller) (32) that dynamically changes the frequency range based on a prediction result of the computation unit.

Furthermore, in an optical fiber characteristic measurement device of one or more embodiments of the present invention, the spectrum analysis unit is provided with a learning unit (33) that performs the machine learning so an error between the prediction result of the computation unit and a peak frequency obtained by analyzing the Brillouin gain spectrum obtained after changing the frequency range based on the prediction result of the computation unit is smaller than a predefined threshold and updates the learning model used by the computation unit.

Furthermore, in an optical fiber characteristic measurement device of one or more embodiments of the present invention, the setting control unit changes the frequency range to be asymmetrical relative to the peak frequency predicted by the computation unit.

Furthermore, in an optical fiber characteristic measurement device of one or more embodiments of the present invention, the spectrum analysis unit changes the frequency range of obtaining the Brillouin gain spectrum by the spectrum acquisition unit to be narrower than a preset reference frequency range.

Furthermore, in an optical fiber characteristic measurement device of one or more embodiments of the present invention, the spectrum analysis unit, after changing the frequency range of obtaining the Brillouin gain spectrum by the spectrum acquisition unit to be narrower than the reference frequency range, changes again the frequency range of obtaining the Brillouin gain spectrum by the spectrum acquisition unit without changing a width of the frequency range.

Furthermore, an optical fiber characteristic measurement device of one or more embodiments of the present invention is further provided with a buffer unit (buffer) (BL1, BL2) that buffers temperature or strain transmission to the optical fiber under test.

Furthermore, an optical fiber characteristic measurement device of one or more embodiments of the present invention is provided with a light-source unit (light source) (11) that outputs frequency-modulated continuous light (L1), a first optical splitting unit (first optical splitter) (12) that splits the continuous light into pump light (LP) and reference light (LR), and a second optical splitting unit (second optical splitter) (13) that causes the pump light to be incident from one end of the optical fiber under test and outputs the Brillouin scattered light arising in the optical fiber under test, wherein the detection unit detects interference light between the Brillouin scattered light and the reference light.

An optical fiber characteristic measurement method of one or more embodiments of the present invention has a detection step (S11, S15, S22, S28) of detecting Brillouin scattered light (LS) obtained by causing pump light (LP) to be incident on an optical fiber under test (FUT), a spectrum acquisition step (S11, S15, S22, S28) of obtaining a Brillouin gain spectrum that is a spectrum of the Brillouin scattered light from a detection signal obtained at the detection step, and a spectrum analysis step (S12 to S14, S16, S23, S24, S27, S29, S31) of measuring a characteristic of the optical fiber under test by analyzing the Brillouin gain spectrum obtained at the spectrum acquisition step to seek (i.e., identify) a Brillouin frequency shift and next changing a frequency range of obtaining the Brillouin gain spectrum according to a peak frequency obtained by analyzing the Brillouin gain spectrum.

One or more embodiments of the present invention may measure characteristics of an optical fiber under test in a shorter time without increasing a number of measurement points.

DETAILED DESCRIPTION

An optical fiber characteristic measurement device and an optical fiber characteristic measurement method of one or more embodiments of the present invention are described in detail below with reference to the drawings. First, a summary of the embodiments of the present invention is given below, and next, details of one or more embodiments of the present invention are described.

One or more embodiments of the present invention may enable characteristics of an optical fiber under test to be measured in a shorter time without increasing a number of measurement points. Here, to measure the characteristics of the optical fiber under test, a Brillouin gain spectrum needs to be obtained at each measurement point set in a length direction of the optical fiber under test. As such, the number of measurement points is established according to a product of a number of measurement points set in the length direction of the optical fiber under test and a number of measurement points set in a frequency-axis direction for obtaining the Brillouin gain spectrum.

To measure an entirety of the length direction of the optical fiber under test at a high spatial resolution or to widen a measurable temperature or strain range (measurement dynamic range) without degrading measurement precision, it is necessary to increase the number of measurement points. However, as the number of measurement points increases, a measuring time becomes longer.

One or more embodiments of the present invention measure the characteristics of the optical fiber under test by obtaining the Brillouin gain spectrum, which is a spectrum of Brillouin scattered light obtained by causing light to be incident on the optical fiber under test, and afterward analyzing the Brillouin gain spectrum to seek a Brillouin frequency shift. Then, according to the peak frequency obtained by analyzing the Brillouin gain spectrum, next, a frequency range of obtaining the Brillouin gain spectrum (measurement range) is changed.

That is, in one or more embodiments, the measurement range is dynamically shifted in the frequency-axis direction based on a most recently obtained peak frequency and only a Brillouin gain spectrum of a frequency range necessary to measure the characteristics of the optical fiber under test (to seek the Brillouin frequency shift) is obtained. This enables the characteristics of the optical fiber under test to be measured in a shorter time without increasing the number of measurement points.

<Configuration of Optical Fiber Characteristics Measurement Device>

Figure 1:
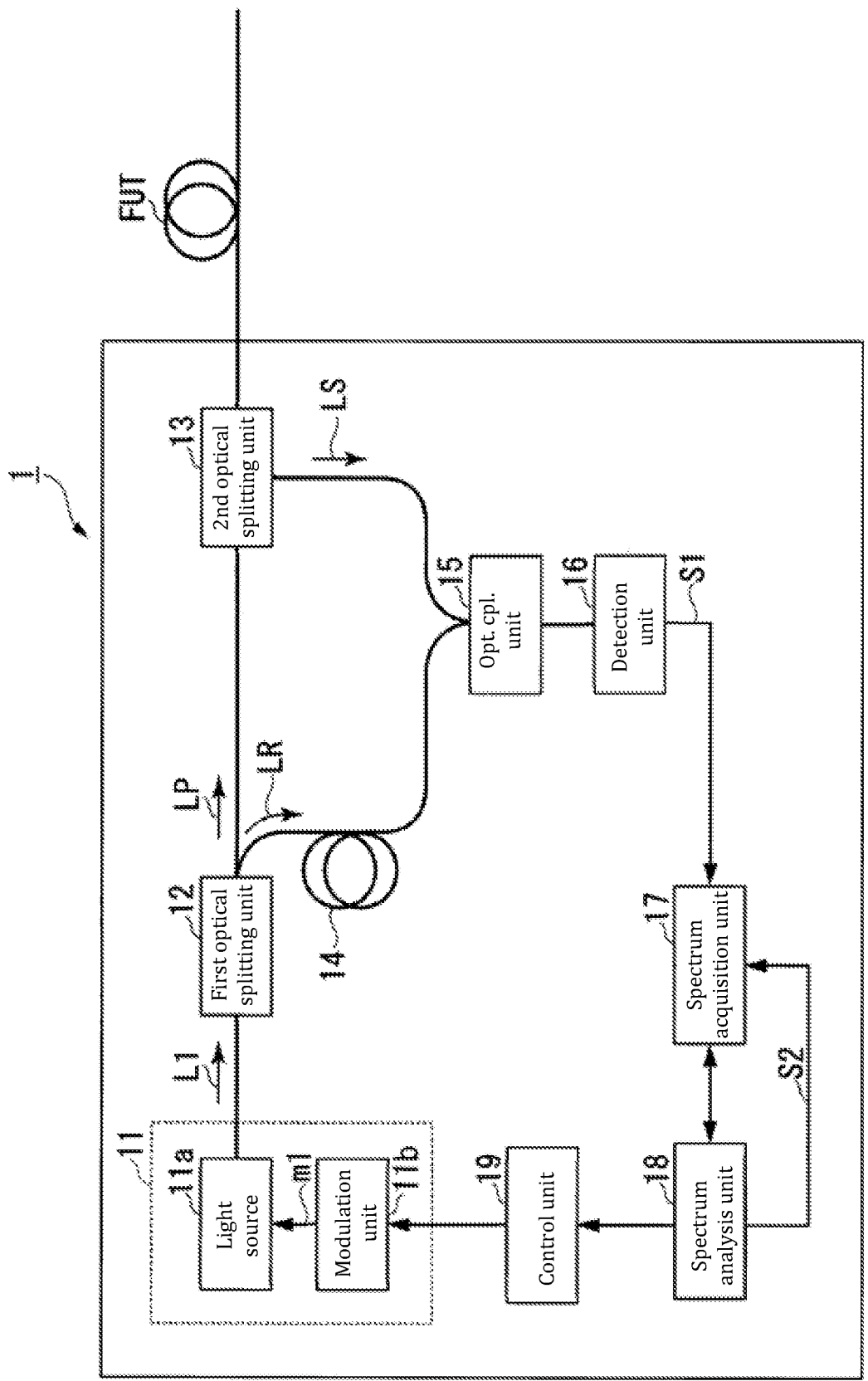
FIG. 1 shows a block diagram illustrating a principal configuration of an optical fiber characteristic measurement device in accordance with one or more embodiments.

FIG. 1 is a block diagram illustrating a principal configuration of an optical fiber characteristic measurement device of one or more embodiments of the present invention. As illustrated in FIG. 1, an optical fiber characteristic measurement device 1 of one or more embodiments is provided with a light-source unit 11, a first optical splitting unit 12, a second optical splitting unit 13, an optical delay unit 14, an optical coupling unit 15, a detection unit 16, a spectrum acquisition unit 17, a spectrum analysis unit 18, and a control unit (main controller) 19.

The optical fiber characteristic measurement device 1 of one or more embodiments of the present invention is a so-called BOCDR measurement device that measures characteristics of an optical fiber under test FUT based on Brillouin scattered light LS obtained by causing pump light LP to be incident on the optical fiber under test FUT. The pump light LP is continuous light imparted with frequency modulation. The Brillouin scattered light LS is a backscattered light arising from Brillouin scattering in the optical fiber under test FUT. Note that any optical fiber can be used as the optical fiber under test FUT according to a wavelength and the like of the pump light LP. Moreover, in one or more embodiments of the present invention, to simplify description, it is supposed that only one correlation peak appears in the optical fiber under test FUT.

The light-source unit 11 is provided with a light source 11a and a modulation unit (modulator) 11b and outputs continuous light L1 that is frequency-modulated as controlled by the control unit 19. The light source 11a is provided with a semiconductor laser element such as a distributed feedback laser diode (DFB-LD) and outputs the frequency-modulated continuous light L1 according to a modulation signal ml output from the modulation unit 11b. As controlled by the control unit 19, the modulation unit 11b outputs the modulation signal ml for frequency-modulating the continuous light L1 output from the light source 11a. This modulation signal ml is, for example, a sinusoidal signal, and a frequency (modulation frequency fm) and amplitude thereof are controlled by the control unit 19.

The first optical splitting unit 12 splits the continuous light L1 output from the light-source unit 11 into the pump light LP and a reference light LR, which have a predefined intensity ratio (for example, 1 to 1). The second optical splitting unit 13 is provided with a first port, a second port, and a third port. The first port is connected to the first optical splitting unit 12. The second port is connected to the optical fiber under test FUT. The third port is connected to the optical coupling unit 15. The second optical splitting unit 13 outputs the pump light LP input from the first port to the second port. Moreover, it outputs the Brillouin scattered light LS from the optical fiber under test FUT input from the second port to the third port. As this second optical splitting unit 13, for example, an optical circulator can be used.

The optical delay unit 14 delays the reference light LR split by the first optical splitting unit 12 by a predetermined time. The optical delay unit 14 includes, for example, an optical fiber of a predetermined length. By changing the length of the optical fiber, the delay time can be adjusted. This optical delay unit 14 is provided to dispose a zeroth-order correlation peak whose appearance position does not move even if the modulation frequency fm is swept outside the optical fiber under test FUT. Note that the optical delay unit 14 may be provided between the first optical splitting unit 12 and the second optical splitting unit 13.

The optical coupling unit 15 couples the Brillouin scattered light LS from the optical fiber under test FUT output from the third port of the second optical splitting unit 13 and the reference light LR that is output from the first optical splitting unit 12 and passed through the optical delay unit 14. Moreover, the optical coupling unit 15 splits the coupled light into two lights of a predefined intensity ratio (for example, 1 to 1) and outputs these to the detection unit 16. Each of the two lights split by the optical coupling unit 15 includes, for example, the backscattered light from the optical fiber under test FUT at 50% and the reference light at 50%. As this optical coupling unit 15, for example, an optical coupler can be used.

The detection unit 16 performs optical heterodyne detection by causing the Brillouin scattered light LS and the reference light LR included in the two lights output from the optical coupling unit 15 to interfere. The detection unit 16 is provided with, for example, a balanced photodiode made by connecting two photodiodes (PDs) in series, and the two photodiodes respectively receive the two lights output from the optical coupling unit 15. The detection unit 16 outputs a detection signal S1 that is an interference signal (beat signal) indicating a frequency difference between the Brillouin scattered light LS and the reference light LR.

The spectrum acquisition unit 17 measures frequency characteristics of the detection signal S1 output from the detection unit 16. That is, the spectrum acquisition unit 17 obtains a Brillouin gain spectrum from the detection signal S1 output from the detection unit 16. Here, a frequency range (measurement range) for which the spectrum acquisition unit 17 obtains the Brillouin gain spectrum is set based on a setting signal S2 output from the spectrum analysis unit 18. This is to enable the characteristics of the optical fiber under test FUT to be measured in a shorter time without increasing a number of measurement points.

The spectrum acquisition unit 17 may be provided with, for example, an electrical spectrum analyzer (ESA). Alternatively, the spectrum acquisition unit 17 may be provided with a temporal-axis measuring instrument such as an oscilloscope and a transformer that performs a fast Fourier transform (FFT) and transform temporally continuous data acquired by the temporal-axis measuring instrument into spectral data by the transformer. Note that a configuration example of the spectrum acquisition unit 17 is described below.

The spectrum analysis unit 18 measures the characteristics of the optical fiber under test FUT by analyzing the Brillouin gain spectrum obtained by the spectrum acquisition unit 17 to seek a Brillouin frequency shift. This spectrum analysis unit 18 may include a display unit that displays the sought Brillouin frequency shift as physical information such as a strain or a temperature. Moreover, the information such as the strain or the temperature of the optical fiber under test FUT may be interpreted into information signifying a state of an object that is a measurement target thereof and displayed on the display unit. The display unit is, for example, a liquid-crystal display or an organic EL (electroluminescent) display device.

Furthermore, the spectrum analysis unit 18 sets (changes) the measurement range of the spectrum acquisition unit 17 according to a peak frequency obtained by analyzing the Brillouin gain spectrum. For example, the spectrum analysis unit 18 sets the measurement range of the spectrum acquisition unit 17 to be narrower than a preset reference measurement range (reference frequency range). Note that the reference measurement range is set in consideration of, for example, maximum change amounts in temperature and strain expected to affect the optical fiber under test FUT. This setting decreases a number of measurement points set in a frequency-axis direction to obtain the Brillouin gain spectrum and thus enables the characteristics of the optical fiber under test FUT to be measured in a shorter time.

The spectrum analysis unit 18 may set the measurement range of the spectrum acquisition unit 17 to be, for example, symmetrical around the peak frequency obtained by analyzing the Brillouin gain spectrum. That is, the spectrum analysis unit 18 may set the measurement range so an absolute value of a difference between a lowest frequency of the measurement range and the peak frequency and an absolute value of a difference between a highest frequency of the measurement range and the peak frequency are equal. Alternatively, the spectrum analysis unit 18 may set the measurement range of the spectrum acquisition unit 17 to be asymmetrical around the peak frequency.

Furthermore, after setting (changing) the measurement range of the spectrum acquisition unit 17 to be narrower than the reference measurement range, the spectrum analysis unit 18 may change the measurement range without changing a wideness (width) of the measurement range. For example, the measurement range is shifted in the frequency-axis direction while maintaining a constant wideness of the measurement range. When changing the measurement range in this way, a time necessary to measure one measurement range is constant. As such, this is effectively applied when, for example, temperature escalation is constant. Moreover, data obtained when the measurement range is changed in this way is sampled at equivalent times and is thus effective in, for example, various processes such as filtering and machine learning that is described below.

Furthermore, after setting (changing) the measurement range of the spectrum acquisition unit 17 to be narrower than the reference measurement range, the spectrum analysis unit 18 may shift the measurement range in the frequency-axis direction while changing the wideness (width) of the measurement range. For example, (a higher-temperature side of) the measurement range is gradually widened. Changing the measurement range in this way is effective when, for example, temperature escalation is not constant and the temperature escalates rapidly in an exponential function or a quadratic function in that the peak can be prevented from falling outside the range. Note that while there is a demerit of data obtained by changing the measurement range in this manner not being sampled at equivalent times, equal-interval time-series data can be obtained by interpolating and resampling the data.

The control unit 19 controls overall operations of the optical fiber characteristic measurement device 1 while referring to, for example, analysis results of the spectrum analysis unit 18. For example, the control unit 19 controls the modulation unit 11b provided in the light-source unit 11 to change the modulation frequency fm of the continuous light L1 output from the light-source unit 11. The modulation frequency fm of the continuous light L1 is changed, for example, to move the correlation peak along the length direction of the optical fiber under test FUT. Note that the control unit 19 can be realized by, for example, a computer such as a personal computer or a personal computing device.

Figure 2:
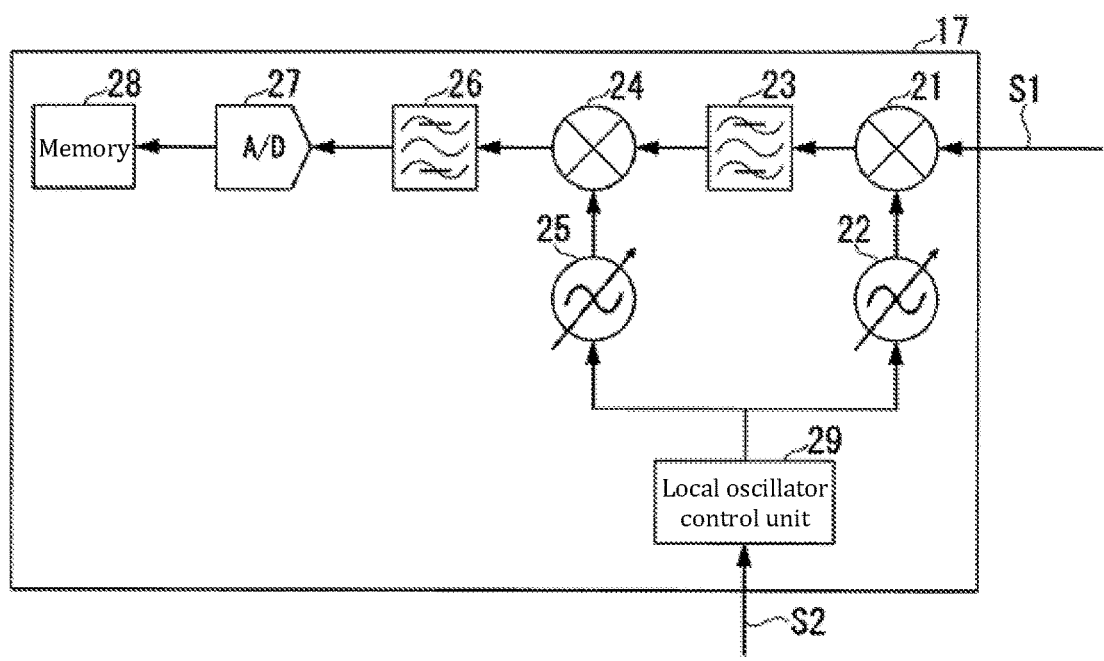
FIG. 2 shows a block diagram illustrating a configuration example of a spectrum acquisition unit in accordance with one or more embodiments.

FIG. 2 is a block diagram illustrating a configuration example of the spectrum acquisition unit in one or more embodiments of the present invention. Note that the spectrum acquisition unit 17 illustrated in FIG. 2 is configured provided with a spectrum analyzer. As illustrated in FIG. 2, the spectrum acquisition unit 17 is provided with a first mixer 21, a first local oscillator 22, a first filter 23, a second mixer 24, a second local oscillator 25, a second filter 26, an A/D converter 27, a memory 28, and a local oscillator control unit (local oscillator controller) 29.

The first mixer 21 mixes the detection signal S1 output from the detection unit 16 and a first local oscillation signal output from the first local oscillator 22 and performs frequency conversion of the detection signal S1. The frequency conversion of the detection signal S1 performed by the first mixer 21 may convert a frequency of the detection signal S1 into a higher frequency (up-conversion) or convert the frequency of the detection signal S1 into a lower frequency (down-conversion). The first filter 23 removes an unnecessary signal (for example, a spurious signal generated by the first mixer 21) included in the signal output from the first mixer 21.

The second mixer 24 mixes the signal passed through the first filter 23 and a second local oscillation signal output from the second local oscillator 25 and performs frequency conversion of the signal passed through the first filter 23. The frequency conversion performed by the second mixer 24 converts the frequency of the signal passed through the first filter 23 into a lower frequency that can be sampled by the A/D converter 27. Like the first filter 23, the second filter 26 removes an unnecessary signal included in the signal output from the second mixer 24.

The A/D converter 27 samples the signal passed through the second filter 26 and converts this into a digital signal. The memory 28 stores the digital signal converted by the A/D converter 27. The local oscillator control unit 29 controls the first local oscillator 22 and the second local oscillator 25 based on the setting signal S2 output from the spectrum analysis unit 18. Specifically, the local oscillator control unit 29 controls changing frequencies of a first local oscillation signal output from the first local oscillator 22 and a second local oscillation signal output from the second local oscillator 25 so a Brillouin gain spectrum in the measurement range set based on the setting signal S2 is obtained.

<Operations of Optical Fiber Characteristics Measurement Device>

First Operation Example

Figure 3:
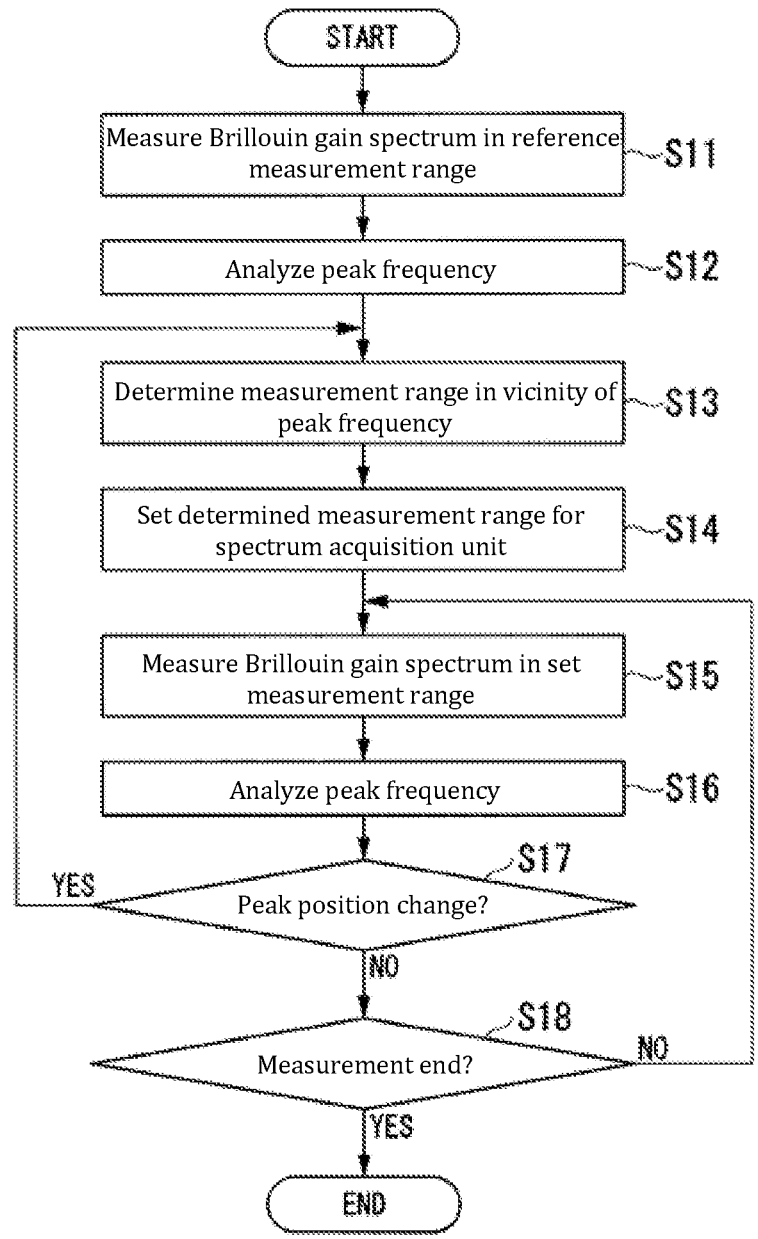
FIG. 3 shows a flowchart illustrating a first operation example of the optical fiber characteristic measurement device in accordance with one or more embodiments.

FIG. 3 is a flowchart illustrating a first operation example of the optical fiber characteristic measurement device of one or more embodiments of the present invention. The flowchart illustrated in FIG. 3 illustrates operations when measuring characteristics of one measurement point set in the length direction of the optical fiber under test FUT. Note that the flowchart illustrated in FIG. 3 starts by, for example, the optical fiber characteristic measurement device 1 being instructed to start measurement.

Figure 4:
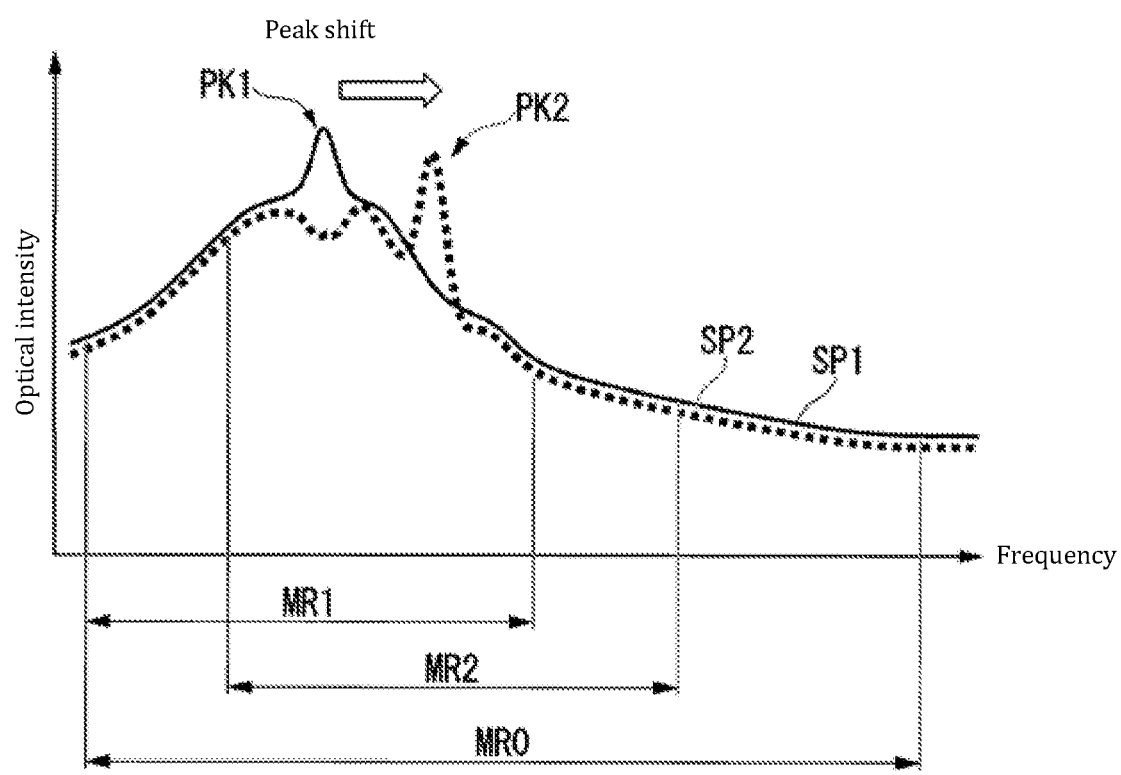
FIG. 4 shows a supplementary diagram for describing the first operation example of the optical fiber characteristic measurement device in accordance with one or more embodiments.

FIG. 4 is a supplementary diagram for describing the first operation example of the optical fiber characteristic measurement device of one or more embodiments of the present invention. This FIG. 4 illustrates one example of the Brillouin gain spectrum obtained by the spectrum acquisition unit 17. Note that in FIG. 4, the horizontal axis is frequency and the vertical axis is optical intensity. Described below is an example wherein an ambient temperature of the optical fiber under test FUT or a strain applied to the optical fiber under test FUT changes and the Brillouin gain spectrum SP1 illustrated in FIG. 4 changes into the Brillouin gain spectrum SP2. Here, the peak frequency of the Brillouin gain spectrum shifts from a peak frequency PK1 to a peak frequency PK2.

When processes of the flowchart illustrated in FIG. 3 start, first, a process is performed of measuring the Brillouin gain spectrum in a preset reference measurement range MR0 (see FIG. 4) (step S11: detection step, spectrum acquisition step). In this process, first, the setting signal S2 is output from the spectrum analysis unit 18 to the spectrum acquisition unit 17 and the measurement range of the spectrum acquisition unit 17 is set to the reference measurement range MR0. Afterward, the modulation unit 11b provided in the light-source unit 11 is controlled by the control unit 19 and the continuous light L1 frequency-modulated by the modulation frequency fm is emitted from the light source 11a.

The continuous light L1 emitted from the light source 11a is made incident to the first optical splitting unit 12 and split into the pump light LP and the reference light LR. The split pump light LP is made incident on the optical fiber under test FUT via the second optical splitting unit 13 and propagated in the optical fiber under test FUT. In conjunction therewith, the Brillouin scattered light LS is sequentially generated in the optical fiber under test FUT, propagated in an opposite direction of a direction wherein the pump light LP is propagated, and sequentially emitted from one end of the optical fiber under test FUT.

The Brillouin scattered light LS emitted from the one end of the optical fiber under test FUT is made incident on the optical coupling unit 15 via the second optical splitting unit 13. The Brillouin scattered light LS incident on the optical coupling unit 15 is coupled with the reference light LR which is split by the first optical splitting unit 12 and passed through the optical delay unit 14, and the interference light thereof is detected by the detection unit 16. When the interference light is detected, the detection signal S1 is output from the detection unit 16 to the spectrum acquisition unit 17.

When the detection signal S1 is input to the spectrum acquisition unit 17, the local oscillator control unit 29 illustrated in FIG. 2 controls the first local oscillator 22 and the second local oscillator 25 according to the measurement range preset for the spectrum acquisition unit 17, and optical intensities of the measurement points set in the frequency-axis direction are sequentially measured. For example, when the reference measurement range MR0 illustrated in FIG. 4 is 1,000 MHz and the measurement points are set at intervals of 1 MHz in the reference measurement range MR0, the number of measurement points is 1,000 (1,001 when measurement points are set on both ends of the reference measurement range MR0). Here, the optical intensity is measured for all 1,000 (or 1,001) measurement points. Measurement results of the spectrum acquisition unit 17 are sequentially stored in the memory 28 provided in the spectrum acquisition unit 17 as measurement data. In this manner, the Brillouin gain spectrum (for example, the Brillouin gain spectrum SP1) is measured.

Next, the spectrum analysis unit 18 performs a process of analyzing the peak frequency of the Brillouin gain spectrum (step S12: spectrum analysis step). Specifically, the measurement data stored in the memory 28 of the spectrum acquisition unit 17 is read by the spectrum analysis unit 18. Then, the read measurement data is subjected to smoothing, filtering for noise removal, maximum-value extraction, curve fitting, and the like by the spectrum analysis unit 18 to seek the peak frequency (for example, the peak frequency PK1). Note that in addition to the above processes, the spectrum analysis unit 18 also performs a process of measuring the characteristics of the optical fiber under test FUT by analyzing the Brillouin gain spectrum to seek the Brillouin frequency shift.

Next, the spectrum analysis unit 18 performs a process of determining a measurement range in a vicinity of the peak frequency (step S13: spectrum analysis step). For example, as illustrated in FIG. 4, the spectrum analysis unit 18 performs a process of determining a measurement range MR1 that is narrower than the reference measurement range MR0 and includes the peak frequency PK1. Note that the measurement range MR1 may be symmetrical or asymmetrical relative to the peak frequency PK1. Then, the spectrum analysis unit 18 outputs the setting signal S2 to the spectrum acquisition unit 17, and a process is performed of setting the spectrum acquisition unit 17 with the determined measurement range (for example, the measurement range MR1) (step S14: spectrum analysis step).

Because these processes decrease the number of measurement points set in the frequency-axis direction, a time required to measure the characteristics of the optical fiber under test FUT can be shortened. For example, when the measurement range MR1 illustrated in FIG. 4 is 200 MHz, the number of measurement points is 200 (201 when measurement points are set on both ends of the measurement range MR1). Here, because the number of measurement points can be reduced to about one-fifth of the measurement points set for the reference determination range MR0 (1,000 or 1,001), the measurement time can also be shortened to about one-fifth.

Here, as illustrated in FIG. 4, the peak frequency PK1 is only present in a small portion of the Brillouin gain spectrum SP1. As such, the Brillouin frequency shift can be sought by merely obtaining measurement data in the vicinity of the peak frequency PK1 of the Brillouin gain spectrum SP1. That is, in seeking the Brillouin frequency shift, the Brillouin gain spectrum SP1 does not necessarily need to be measured over an entirety of the reference measurement range MR0, and it is sufficient to merely measure the vicinity of the peak frequency PK1 of the Brillouin gain spectrum SP1.

When these processes end, a process is performed of measuring the Brillouin gain spectrum in the newly set measurement range (for example, the measurement range MR1) (step S15: detection step, spectrum acquisition step). When the Brillouin gain spectrum is measured, the spectrum analysis unit 18 performs a process of analyzing the peak frequency of the measured Brillouin gain spectrum (step S16: spectrum analysis step). Because the processes of steps S14 and S15 are respectively identical to the processes of steps S11 and S12, here, detailed description is omitted. Note that in addition to these processes, the spectrum analysis unit 18 also performs a process of measuring the characteristics of the optical fiber under test FUT by analyzing the Brillouin gain spectrum to seek the Brillouin frequency shift.

When the above processes end, the spectrum analysis unit 18 determines whether a peak position (peak frequency) is changed. For example, it is determined whether a change amount of the peak frequency PK1 illustrated in FIG. 4 exceeds a predefined threshold frequency. Note that as in an MT method (Mahalanobis-Taguchi method) involving machine learning, the threshold frequency may be determined from accumulated measurement data. When it is determined that the peak position is not changed (when a determination result of step S17 is "NO"), the control unit 19 determines whether measurement is ended (step S18). For example, it is determined whether the optical fiber characteristic measurement device 1 is instructed to end measurement.

When it is determined that measurement is not ended (when a determination result of step S18 is "NO"), the processes of step S15 to step S17 are performed again. That is, the process of measuring the characteristics of the optical fiber under test FUT is performed again by measuring the Brillouin gain spectrum in the measurement range set at step S14 (for example, the measurement range MR1), analyzing the peak frequency, and seeking the Brillouin frequency shift.

Here, it is supposed for example that, as illustrated in FIG. 4, the Brillouin gain spectrum changes from the Brillouin gain spectrum SP1 to the Brillouin gain spectrum SP2 and the peak frequency thereof shifts from the peak frequency PK1 to the peak frequency PK2. The spectrum analysis unit 18 then determines that the peak position is changed, and the determination result of step S17 becomes "YES." The spectrum analysis unit 18 then performs the process of determining the measurement range in the vicinity of the shifted peak frequency (peak frequency PK2) (step S13).

For example, as illustrated in FIG. 4, the spectrum analysis unit 18 performs a process of determining the measurement range MR2 that is narrower than the reference measurement range MR0 and includes the shifted peak frequency PK2. Note that the measurement range MR2 may be symmetrical or asymmetrical relative to the peak frequency PK2. Moreover, a width of the measurement range MR2 may be identical to or different from a width of the measurement range MR1. Then, the spectrum analysis unit 18 outputs the setting signal S2 to the spectrum acquisition unit 17, and a process is performed of setting the spectrum acquisition unit 17 with the determined measurement range (for example, the measurement range MR2) (step S14).

When these processes end, the spectrum acquisition unit 17 performs a process of measuring the Brillouin gain spectrum in the newly set measurement range (for example, the measurement range MR2) (step S15). Moreover, the spectrum analysis unit 18 performs a process of analyzing the peak frequency of the measured Brillouin gain spectrum (step S16). Then, the spectrum analysis unit 18 determines whether the peak position is changed (step S17).

Subsequently, when it is determined that the peak position is changed (when the determination result of step S17 is "YES"), the processes of step S13 to step S17 are performed, and when it is determined what the peak position is not changed (when the determination result of step S17 is "NO"), the processes of step S15 to step S18 are performed. Note that when it is determined that measurement is ended (when the determination result of step S18 is "YES"), the series of processes illustrated in FIG. 3 ends.

Figure 5:
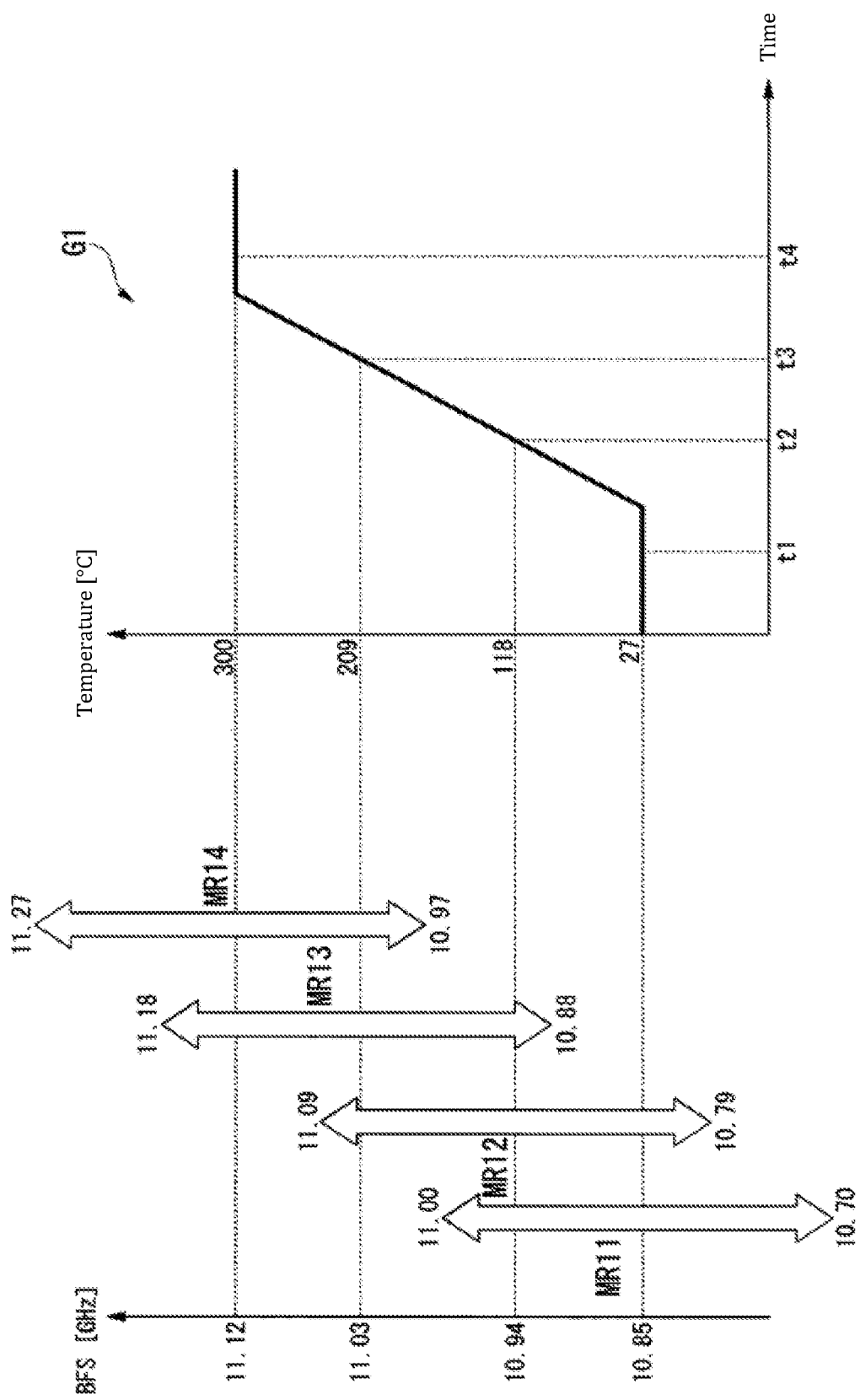
FIG. 5 shows a diagram for describing a variation of measurement ranges in accordance with one or more embodiments.

FIG. 5 is a diagram for describing a variation of the measurement ranges in one or more embodiments of the present invention. Note that described here is a variation of the measurement ranges when measuring the ambient temperature of the optical fiber under test FUT. It is supposed that, as illustrated in graph G1 in FIG. 5, the ambient temperature of the optical fiber under test FUT is constant at 27° C. until a certain point but thereafter changes rapidly, rising to 300° C.

Specifically, in the example illustrated in graph G1, the ambient temperature of the optical fiber under test FUT is 27° C. at a time t1 (for example, 1 sec.), 118° C. at a time t2 (for example, 2 sec.), 209° C. at a time t3 (for example, 3 sec.), and 300° C. at a time t4 (for example, 4 sec.). In this example, supposing a slope of temperature escalation to be 91° C./sec., 27° C. to 300° C. is attained 3 sec. after temperature escalation starts.

Furthermore, the ambient temperature of the optical fiber under test FUT and the Brillouin frequency shift (BFS) are in a correspondence relationship. Specifically, as illustrated in FIG. 5, the Brillouin frequency shift is 10.85 GHz when the ambient temperature of the optical fiber under test FUT is 27° C., 10.94 GHz when 118° C., 11.03 GHz when 209° C., and 11.12 GHz when 300° C.

In the example illustrated in FIG. 5, a measurement range MR11 at the time t1 before the temperature changes is set to a frequency range that can measure a Brillouin frequency shift of, for example, 10.70 to 11.0 GHz. Note that the peak frequency of the Brillouin gain spectrum at this time is 10.85 GHz. The measurement range MR11 is a range of ±0.15 GHz centered around the peak frequency (10.85 GHz) of the Brillouin gain spectrum.

At the time t2, when the temperature starts to rise, the peak frequency of the Brillouin gain spectrum shifts from 10.85 GHz to 10.94 GHz. To match this shift, a next measurement range MR12 is set to, for example, 10.79 to 11.09 GHz. Note that the measurement range MR12 is a range of ±0.15 GHz centered around the peak frequency (10.94 GHz) of the Brillouin gain spectrum.

Next, at the time t3, the peak frequency of the Brillouin gain spectrum shifts from 10.94 GHz to 11.03 GHz. To match this shift, a next measurement range MR13 is set to, for example, 10.88 to 11.18 GHz. Note that the measurement range MR13 is a range of ±0.15 GHz centered around the peak frequency (11.03 GHz) of the Brillouin gain spectrum.

Next, at the time t4, the peak frequency of the Brillouin gain spectrum shifts from 11.03 GHz to 11.12 GHz. To match this shift, a next measurement range MR14 is set to, for example, 10.97 to 11.27 GHz. Note that the measurement range MR14 is a range of ±0.15 GHz centered around the peak frequency (11.12 GHz) of the Brillouin gain spectrum.

In this manner, the measurement range (measurement ranges MR11 to MR14) are sequentially set (changed) according to changes in the peak frequency of the Brillouin gain spectrum due to changes in the ambient temperature of the optical fiber under test FUT. Doing so makes it sufficient to measure only a limited measurement range (measurement ranges MR11 to MR14), and this enables the time required to measure the characteristics of the optical fiber under test FUT to be shortened. Moreover, sequentially setting (changing) the measurement range (measurement ranges MR11 to MR14) can ensure a sufficient measurement dynamic range.

Note that it is also conceivable for the escalation rate of the ambient temperature of the optical fiber under test FUT to be fast such that a measurement range following the changes in the peak frequency of the Brillouin gain spectrum cannot be set. Here, an example can be given of the ambient temperature of the optical fiber under test FUT already reaching 300° C. when the measurement range MR12 illustrated in FIG. 5 is set. Here, a method can be employed of, for example, expanding the measurement range and remeasuring or remeasuring the Brillouin gain spectrum over the entirety of the reference measurement range MR0 as is done conventionally. For example, in the flowchart illustrated in FIG. 3, when no peak frequency is obtained at the process of step S16, the process of step S11 may be returned to remeasure the Brillouin gain spectrum over the entirety of the reference measurement range MR0.

Second Operation Example

Figure 6:
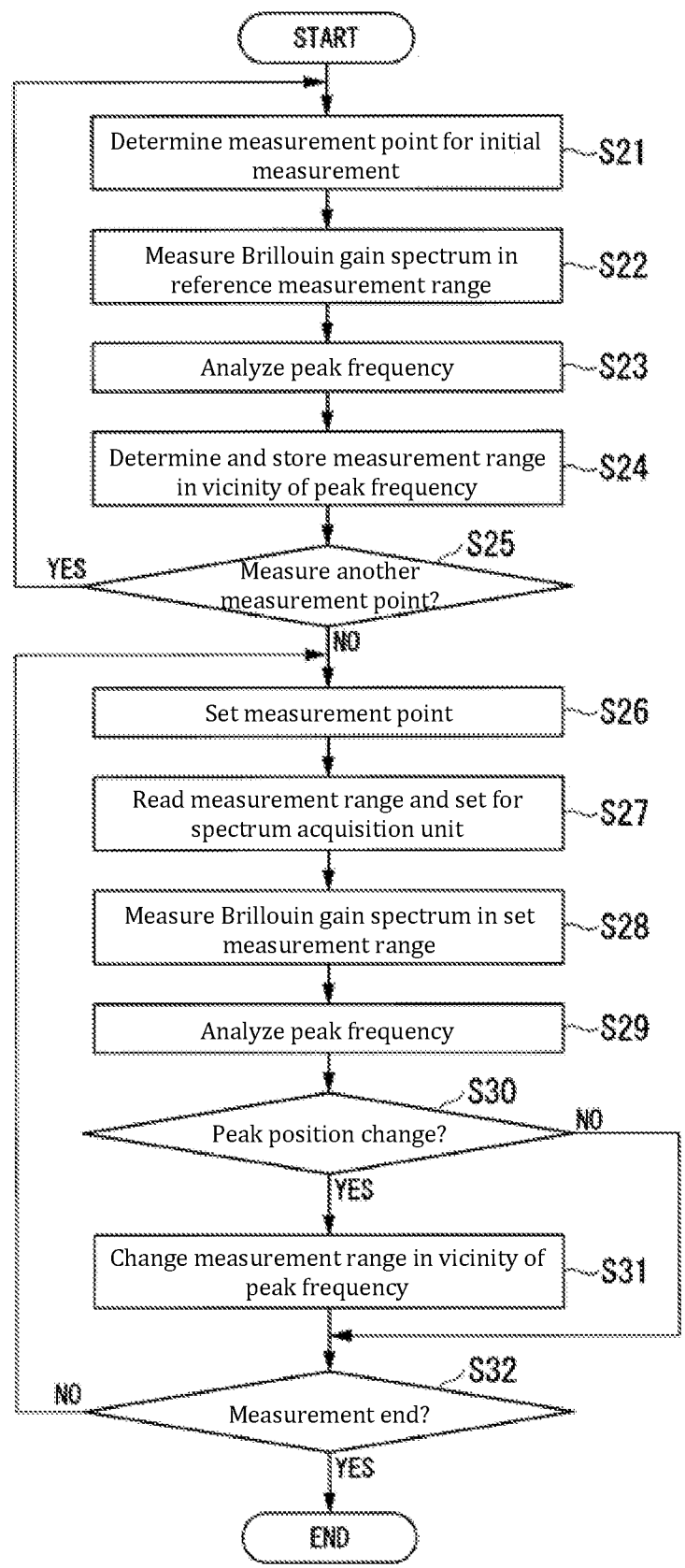
FIG. 6 shows a flowchart illustrating a second operation example of the optical fiber characteristic measurement device in accordance with one or more embodiments.

FIG. 6 is a flowchart illustrating a second operation example of the optical fiber characteristic measurement device of one or more embodiments of the present invention. The flowchart illustrated in FIG. 6 illustrates operations when measuring characteristics of a plurality of different measurement points set in the length direction of the optical fiber under test FUT. In the present operation example, the measurement range of the spectrum acquisition unit 17 is set individually for each measurement point. Note that the flowchart illustrated in FIG. 6 starts by, for example, the optical fiber characteristic measurement device 1 being instructed to start measurement.

When processes of the flowchart illustrated in FIG. 6 are started, first, a process of determining the measurement point for which to perform an initial measurement is performed (step S21). Here, the initial measurement refers to the measurement of the Brillouin gain spectrum that is performed first among the measurement points upon setting the measurement range of the spectrum acquisition unit 17 to the reference measurement range MR0. Specifically, at step S21, the control unit 19 performs the process of determining the measurement point for which to perform the initial measurement among the plurality of different measurement points set along the optical fiber under test FUT. When the measurement point for which to perform the initial measurement is determined, the modulation unit 11b provided in the light-source unit 11 is controlled by the control unit 19 and the frequency of the modulation signal ml (modulation frequency fm) is adjusted so the correlation peak appears at the determined measurement point.

Next, the process is performed of measuring the Brillouin gain spectrum in the preset reference measurement range MR0 (see FIG. 4) (step S22: detection step, spectrum acquisition step). In this process, as in step S11 illustrated in FIG. 3, first, the setting signal S2 is output from the spectrum analysis unit 18 to the spectrum acquisition unit 17 and the measurement range of the spectrum acquisition unit 17 is set to the reference measurement range MR0. Afterward, as controlled by the control unit 19, the continuous light L1 frequency-modulated at the modulation frequency fm is emitted from the light-source unit 11. Then, the detection unit 16 detects the interference light between the Brillouin scattered light LS obtained by causing the pump light LP to be incident on the optical fiber under test FUT and the reference light LR and the spectrum acquisition unit 17 performs the process of obtaining the Brillouin gain spectrum from the detection signal S1 output from the detection unit 16.

Next, the spectrum analysis unit 18 performs the process of analyzing the peak frequency of the Brillouin gain spectrum (step S23: spectrum analysis step). Specifically, as in step S12 illustrated in FIG. 3, the process is performed of reading the measurement data stored in the memory 28 of the spectrum acquisition unit 17 and subjecting the read measurement data to various processes such as maximum-value extraction to seek the peak frequency. Note that in addition to the above processes, the spectrum analysis unit 18 also performs the process of measuring the characteristics of the optical fiber under test FUT by analyzing the Brillouin gain spectrum to seek the Brillouin frequency shift.

Next, the spectrum analysis unit 18 performs the process of determining and storing the measurement range in the vicinity of the peak frequency (step S24: spectrum analysis step). For example, as in step S13 illustrated in FIG. 3, the spectrum analysis unit 18 performs the process of determining the measurement range MR1 that is narrower than the reference measurement range MR0 illustrated in FIG. 4 and includes the peak frequency PK1 and storing the determined measurement range MR1. Note that the measurement range MR1 may be symmetrical or asymmetrical relative to the peak frequency PK1.

Next, the control unit 19 determines whether to measure another measurement point (whether to perform the initial measurement with another measurement point) (step S25). For example, when among the plurality of different measurement points set along the optical fiber under test FUT there is a measurement point for which the initial measurement is not performed, a determination result of step S25 becomes "YES." When the determination result of step S25 is "YES," the processes of steps S21 to S24 are repeatedly performed. In this manner, the initial measurement is carried out for each of the plurality of different measurement points set along the optical fiber under test FUT to be measured.

In contrast, when, for example, among the plurality of different measurement points set along the optical fiber under test FUT there is no measurement point for which the initial measurement is not performed, the determination result of step S25 becomes "NO." When the determination result of step S25 is "NO," the initial measurement ends and the flow transitions to normal measurement. Here, normal measurement refers to the measurement of the Brillouin gain spectrum that is performed by setting the spectrum acquisition unit 17 with a measurement range narrower than the reference measurement range.

When normal measurement is transitioned to, first, a process of setting the measurement points for which to perform normal measurement is performed (step S26). Specifically, the control unit 19 performs a process of setting one measurement point for which to perform the normal measurement among the plurality of different measurement points set along the optical fiber under test FUT. When the measurement point for which to perform the normal measurement is set, as in step S21, the modulation unit 11b provided in the light-source unit 11 is controlled by the control unit 19 and the frequency of the modulation signal ml (modulation frequency fm) is adjusted so the correlation peak appears at the set measurement point.

Next, the spectrum analysis unit 18 performs the process of reading the measurement range stored at the process of step S24 and setting the spectrum acquisition unit 17 therewith (step S27: spectrum analysis step). Specifically, the measurement range for the measurement point set at step S26 is read. Then, the spectrum analysis unit 18 outputs the setting signal S2 to the spectrum acquisition unit 17, and a process is performed of setting the spectrum acquisition unit 17 with the read measurement range (for example, the measurement range MR1).

Next, a process is performed of measuring the Brillouin gain spectrum in the set measurement range (step S28: detection step, spectrum acquisition step). In this process, as controlled by the control unit 19, the continuous light L1 frequency-modulated at the modulation frequency fm is emitted from the light-source unit 11. Then, the detection unit 16 detects the interference light between the Brillouin scattered light LS obtained by causing the pump light LP to be incident on the optical fiber under test FUT and the reference light LR and the spectrum acquisition unit 17 performs the process of obtaining the Brillouin gain spectrum from the detection signal S1 output from the detection unit 16.

Next, the spectrum analysis unit 18 performs the process of analyzing the peak frequency of the Brillouin gain spectrum (step S29: spectrum analysis step). Specifically, as in step S23, the process is performed of reading the measurement data stored in the memory 28 of the spectrum acquisition unit 17 and subjecting the read measurement data to various processes such as maximum-value extraction to seek the peak frequency. Note that in addition to the above processes, the spectrum analysis unit 18 also performs the process of measuring the characteristics of the optical fiber under test FUT by analyzing the Brillouin gain spectrum to seek the Brillouin frequency shift.

When the above processes end, the spectrum analysis unit 18 determines whether the peak position (peak frequency) is changed (step S30). Specifically, it is determined whether at the measurement point set at step S26 the peak frequency newly sought in the process of step S29 is changed from a peak frequency sought earlier (for example, the peak frequency sought in the initial measurement). As in the first operation example, this determination is made based on, for example, whether a change amount of the peak frequency exceeds a predefined threshold. Note that as in an MT method (Mahalanobis-Taguchi method) involving machine learning, the threshold frequency may be determined from accumulated measurement data.

When it is determined that the peak position is changed, the determination result of step S30 becomes "YES." Then, the spectrum analysis unit 18 performs a process of changing the measurement range in the vicinity of the peak frequency (step S31: spectrum analysis step). For example, a process is performed of changing the measurement range the spectrum acquisition unit 17 is set with from the measurement range MR1 illustrated in FIG. 4 to the measurement range MR2.

Next, the control unit 19 determines whether measurement is ended (step S32). For example, it is determined whether the optical fiber characteristic measurement device 1 is instructed to end measurement. When it is determined that measurement is not ended (when the determination result of step S32 is "NO"), the flow returns to the process of step S26, the control unit 19 sets a new measurement point for which to perform the normal measurement, and the processes of steps S27 to S29 are performed. Note that at the process of step S26, setting the same measurement point as the measurement point set earlier enables measurement of measuring one measurement point.

When the processes of steps S27 to S29 end, the spectrum analysis unit 18 determines whether the peak position (peak frequency) is changed at the measurement point set at step S26 (step S30). When it is determined that the peak position is changed (when the determination result of step S30 is "YES"), the spectrum analysis unit 18 performs a process of changing the measurement range in the vicinity of the peak frequency (step S31).

In contrast, when it is determined that the peak position is not changed (when the determination result of step S30 is "NO"), the process of step S31 is not performed and the control unit 19 determines whether measurement is ended (step S32). When it is determined that measurement is not ended (when the determination result of step S32 is "NO"), the flow again returns to the process of step S26. In contrast, when it is determined that measurement is ended (when the determination result of step S32 is "YES"), the series of processes illustrated in FIG. 6 ends.

Note that in the present operation example as well, it is conceivable, for example, for the escalation rate of the ambient temperature of the optical fiber under test FUT to be fast such that a measurement range following the changes in the peak frequency of the Brillouin gain spectrum cannot be set. Here, as in the first operation example, a method can be employed of, for example, expanding the measurement range and remeasuring or again carrying out the initial measurement by setting the measurement range of the spectrum acquisition unit 17 to the reference measurement range MR0. For example, in the flowchart illustrated in FIG. 6, when no peak frequency is obtained at the process of step S29, the flow may move to the process of step S31 and the Brillouin gain spectrum may be remeasured upon widening the measurement range.

As above, in one or more embodiments, the detection unit 16 detects the interference light between the Brillouin scattered light LS obtained by causing the pump light LP to be incident on the optical fiber under test FUT and the reference light LR and the Brillouin gain spectrum is obtained from the detection signal S1 output from the detection unit 16. Moreover, the characteristics of the optical fiber under test FUT are measured by analyzing the obtained Brillouin gain spectrum to seek the frequency shift and next, the measurement range of obtaining the Brillouin gain spectrum is changed according to the peak frequency obtained by analyzing the Brillouin gain spectrum. This for example decreases the number of measurement points set in the frequency-axis direction to obtain the Brillouin gain spectrum and thus enables the characteristics of the optical fiber under test FUT to be measured in a shorter time.

Figure 7A:
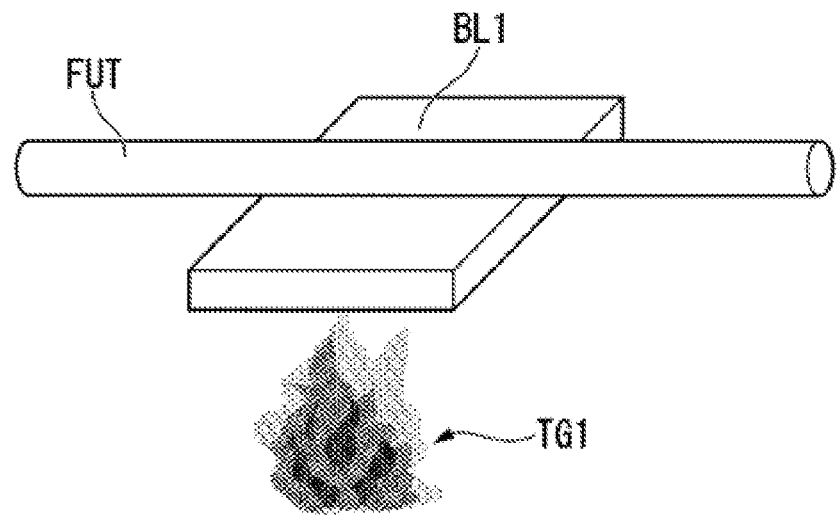
FIGS. 7A and 7B show diagrams illustrating a principal configuration of the optical fiber characteristic measurement device in accordance with one or more embodiments.
Figure 7B:
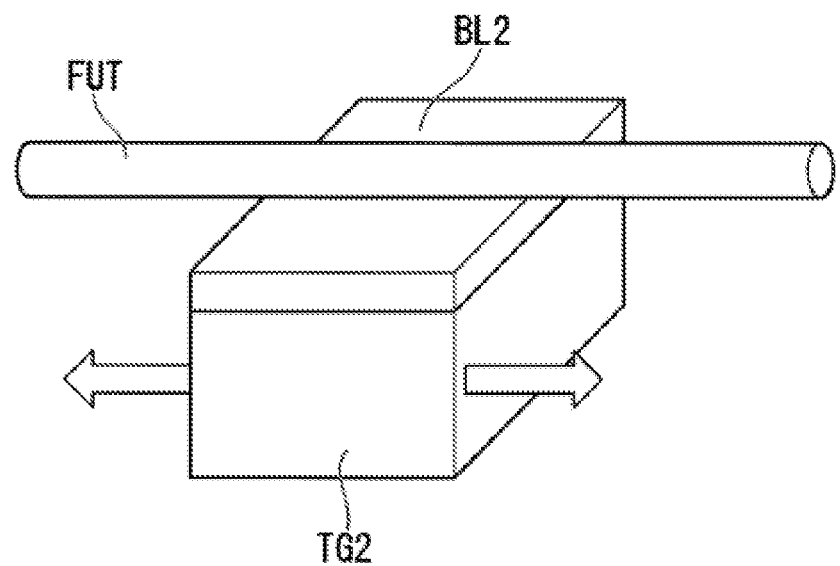

FIG. 7 is a diagram illustrating a principal configuration of the optical fiber characteristic measurement device of one or more embodiments of the present invention. As illustrated in FIG. 7A, the optical fiber characteristic measurement device of one or more embodiments is provided with a buffer layer BL1 (buffer unit) that buffers temperature transmission to the optical fiber under test FUT. Alternatively, as illustrated in FIG. 7B, the optical fiber characteristic measurement device of one or more embodiments is provided with a buffer layer BL2 (buffer unit) that buffers strain transmission to the optical fiber under test FUT. Note that a configuration of a main body of the optical fiber characteristic measurement device connected to the optical fiber under test FUT may be identical to one or more other embodiments described above.

The optical fiber characteristic measurement device 1 of one or more embodiments described above sets the measurement range of the Brillouin gain spectrum according to changes in the peak frequency of the Brillouin gain spectrum. However, when a change in temperature or strain affecting the optical fiber under test FUT is large, it is conceivable that the measurement range cannot be set to follow the change in the peak frequency of the Brillouin gain spectrum.

By being provided with the buffer layer BL1 illustrated in FIG. 7A or the buffer layer BL2 illustrated in FIG. 7B, the optical fiber characteristic measurement device of one or more embodiments buffers temperature or strain transmission affecting the optical fiber under test FUT. This enables change in the peak frequency of the Brillouin gain spectrum to be delayed and setting the measurement range to follow the change in the peak frequency. Note that although it is conceivable that the optical fiber characteristic measurement device of one or more embodiments is insufficient in terms of accurately measuring an absolute value of the temperature or strain affecting the optical fiber under test FUT, it is effective in terms of reliably capturing rapid changes thereof.

In the example illustrated in FIG. 7A, the optical fiber under test FUT are disposed to measure a temperature of a measurement target TG1. The measurement target TG1 is any target of temperature measurement, and a state thereof may be any among solid, liquid, gas, and plasma. The buffer layer BL1 is disposed between the measurement target TG1 and the optical fiber under test FUT in any position in the length direction of the optical fiber under test FUT. Note that the buffer layer BL1 may be provided over an entire length of the optical fiber under test FUT. As the buffer layer BL1, a metal material such as steel, which has a large thermal capacity, can be used.

As illustrated in FIG. 7A, by providing the buffer layer BL1 between the measurement target TG1 and the optical fiber under test FUT, temperature transmission to the optical fiber under test FUT can be delayed even if the temperature of the measurement target TG1 changes rapidly. This also delays change in the peak frequency of the Brillouin gain spectrum and thus enables setting the measurement range to follow the change in the peak frequency. Note that the example illustrated in FIG. 7A is effective in a use of, for example, needing to sound an alarm without false negative of temperature change when a certain threshold is exceeded.

In the example illustrated in FIG. 7B, the optical fiber under test FUT are disposed to measure strain of a measurement target TG2. The measurement target TG2 is any target of strain measurement and is, for example, a structure or a building. The buffer layer BL2 is provided between the measurement target TG2 and the optical fiber under test FUT in any position in the length direction of the optical fiber under test FUT and is fixed to the measurement target TG2 and the optical fiber under test FUT by a method such as adhesion, brazing, or clamping by a fixing jig. Note that the buffer layer BL2 may be provided over the entire length of the optical fiber under test FUT. When the measurement target TG2 is, for example, metal, a resin material with a lower rigidity than metal (for example, a plastic resin material) can be used as the buffer layer BL2.

As illustrated in FIG. 7B, by providing the buffer layer BL2 between the measurement target TG2 and the optical fiber under test FUT, strain transmission to the optical fiber under test FUT can be buffered even if, for example, the measurement target TG2 rapidly extends (or contracts) in the direction of the arrows illustrated in FIG. 7B. This delays change in the peak frequency of the Brillouin gain spectrum and thus enables setting the measurement range to follow the change in the peak frequency. Note that the example illustrated in FIG. 7B is effective in a use of, for example, needing to sound an alarm without false negative of strain change when a certain threshold is exceeded.

As above, one or more embodiments are provided with the buffer layers BL1, BL2 that buffer temperature or strain transmission to the optical fiber under test FUT. This enables temperature transmission to the optical fiber under test FUT to be delayed even if the temperature of the measurement target TG1 changes rapidly. Alternatively, strain transmission to the optical fiber under test FUT can be buffered even if the measurement target TG2 deforms rapidly. This enables setting the measurement range to follow the change in the peak frequency of the Brillouin gain spectrum even if the change in temperature or strain affecting the optical fiber under test FUT is large.

Figure 8:
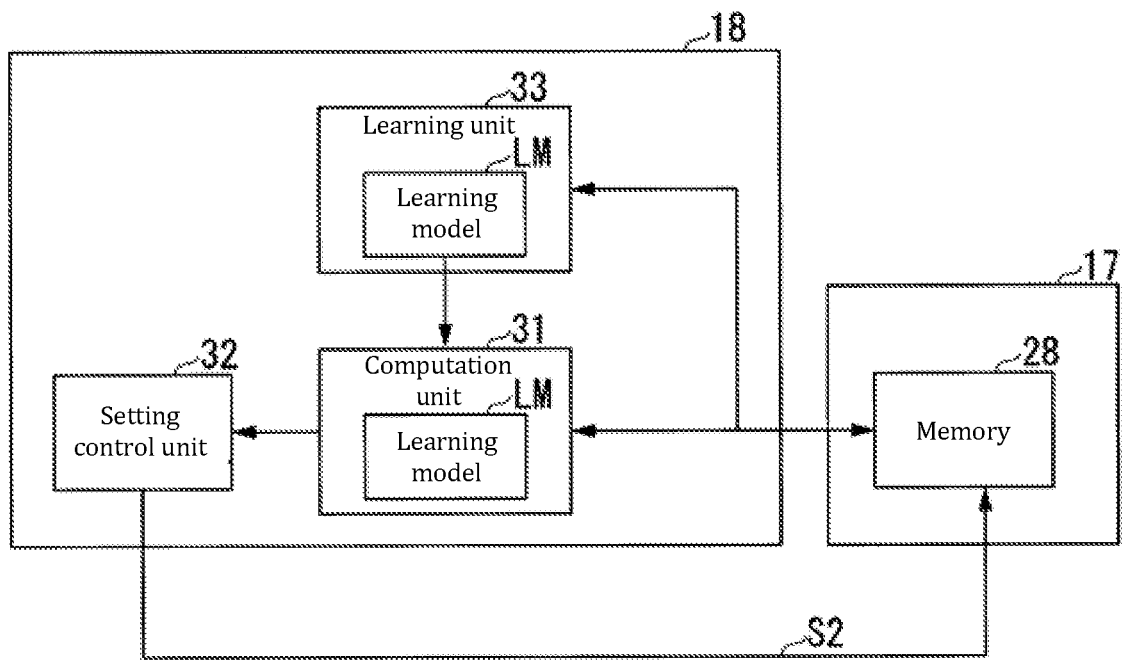
FIG. 8 shows a diagram illustrating a principal configuration of the optical fiber characteristic measurement device in accordance with one or more embodiments.

FIG. 8 is a diagram illustrating a principal configuration of the optical fiber characteristic measurement device of one or more embodiments of the present invention. Note that FIG. 8 illustrates only the spectrum acquisition unit 17 and the spectrum analysis unit 18 illustrated in FIG. 1 and omits illustration of configurations other than the spectrum acquisition unit 17 and the spectrum analysis unit 18 (the light-source unit 11 to the detection unit 16 and the control unit 19). Moreover, only the memory 28 is illustrated in the spectrum acquisition unit 17. Note that FIG. 8 uses the same reference signs for configurations corresponding to the configurations illustrated in FIG. 1 and FIG. 2.

The optical fiber characteristic measurement device 1 of one or more embodiments described above next sets the measurement range of obtaining the Brillouin gain spectrum according to the peak frequency obtained by analyzing the Brillouin gain spectrum. However, this setting method follows changes in temperature and strain that affect the optical fiber under test FUT, and it is conceivable that the measurement range may be unable to be set to follow the change in the peak frequency of the Brillouin gain spectrum when the change in temperature or strain affecting the optical fiber under test FUT is large.

The optical fiber characteristic measurement device of one or more embodiments described above is provided with the buffer layers BL1, BL2 illustrated in FIGS. 7A and 7B, buffers temperature or strain transmission affecting the optical fiber under test FUT, and delays the change in the peak frequency of the Brillouin gain spectrum. Although this enables setting the measurement range to follow the change in the peak frequency, it is conceivable that this configuration is insufficient in terms of accurately measuring an absolute value of the temperature or strain affecting the optical fiber under test FUT.

The optical fiber characteristic measurement device of one or more embodiments predicts a peak frequency likely to be obtained next time based on a peak frequency obtained by analyzing the Brillouin gain spectrum and changes the measurement range of the spectrum acquisition unit 17 based on this prediction result. Prediction of the peak frequency is performed using, for example, a learning model obtained by performing machine learning using data indicating change over time in the peak frequency obtained by analyzing the Brillouin gain spectrum. In the optical fiber characteristic measurement device of one or more embodiments, the spectrum analysis unit 18 performs this peak-frequency prediction and changing of the measurement range based on the prediction result.

As illustrated in FIG. 8, the spectrum analysis unit 18 is provided with a computation unit 31, a setting control unit 32, and a learning unit 33. The computation unit 31 predicts the peak frequency likely to be obtained next time based on the peak frequency obtained by analyzing the Brillouin gain spectrum. The computation unit 31 is provided with a learning model LM and uses this learning model LM and recent peak frequencies obtained by analyzing the Brillouin gain spectrum to predict the peak frequency likely to be obtained next time.

The learning model LM can be obtained by, for example, performing machine learning using the data indicating change over time in the peak frequency obtained in the past. The learning model LM may also be obtained by performing machine learning using data indicating change over time in the Brillouin gain spectrum obtained in the past (that is, the measurement data sequentially output from the spectrum acquisition unit 17 in the past) instead of the data indicating change over time in the peak frequency obtained in the past.

In one or more embodiments, it is supposed that machine learning using a recurrent neural network (RNN) is performed as the machine learning for obtaining the learning model LM. Note that machine learning for obtaining the learning model LM is not limited to machine learning using a recurrent neural network, and any machine learning may be used, such as machine learning using a support-vector machine (SVM).

Figure 9:
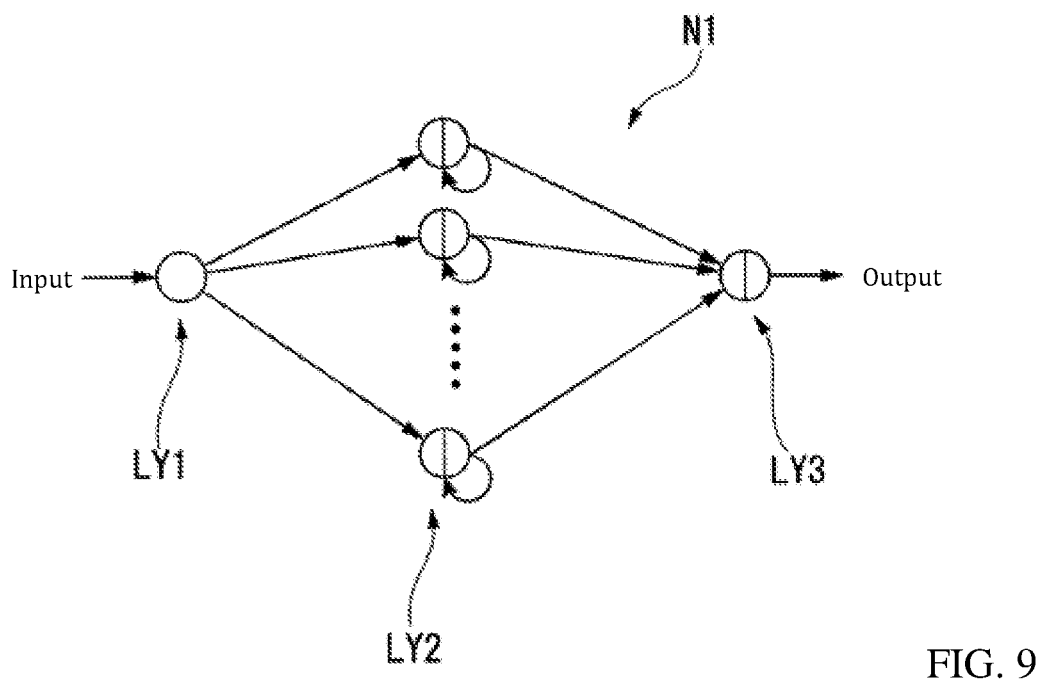
FIG. 9 shows a diagram illustrating one example of a recurrent neural network used in machine learning in accordance with one or more embodiments.

FIG. 9 is a diagram illustrating one example of the recurrent neural network used in machine learning in one or more embodiments of the present invention. The recurrent neural network N1 illustrated in FIG. 9 is a network made of three layers—an input layer LY1, a hidden layer LY2, and an output layer LY3. The input layer LY1 and the output layer LY3 have only one node, and the hidden layer LY2 has a plurality of nodes.

To the node of the input layer LY1, the data indicating change over time in the peak frequency obtained in the past is input. Note that instead of the data indicating change over time in the peak frequency obtained in the past, the data indicating change over time in the Brillouin gain spectrum obtained in the past may be input to the node of the input layer LY1. Here, the node of the input layer LY1 may be a plurality of nodes according to characteristics of the data input to the input layer LY1.

Each node of the hidden layer LY2 is coupled to the node of the input layer LY1. The plurality of nodes of the hidden layer LY2 is realized by, for example, a recurrent perceptron. As such, the plurality of nodes of the hidden layer LY2 performs feedback of the data input to the node of the input layer LY1, storing and holding this data for a certain time. Because these nodes hold past data, they are essential in predicting a future state. As an activation function (function of determining an output value) used by the plurality of nodes of the hidden layer LY2, for example, a rectified linear unit (ReLU) can be used. Note that the activation function is not limited to the ReLU, and any activation function other than the ReLU can be used.

All nodes of the hidden layer LY2 are coupled to the node of the output layer LY3. Outputs of all nodes of the hidden layer LY2 are input to the node of the output layer LY3, and the node of the output layer LY3 outputs the peak frequency predicted to be likely obtained next time. Note that as an activation function used for the node of the output layer LY3, a linear activation function can be used.

The learning model LM is obtained by machine learning that applies training data combining input data and output data to the recurrent neural network N1 illustrated in FIG. 9. Using the learning model LM obtained by machine learning using this training data enables a next change to be predicted from learning results within a certain error range when, for example, the measurement target (temperature or strain) changes periodically or changes characteristically.

The setting control unit 32 dynamically changes the measurement range set for the spectrum acquisition unit 17 based on the peak frequency predicted by the computation unit 31. The setting control unit 32 outputs the setting signal S2 when changing the measurement range set for the spectrum acquisition unit 17. For example, the setting control unit 32 sets the measurement range of the spectrum acquisition unit 17 to be symmetrical (or asymmetrical) around the peak frequency predicted by the computation unit 31.

Here, when setting the measurement range to be asymmetrical around the predicted peak frequency, the measurement range may be set to be biased in a direction wherein the peak frequency is predicted to change. For example, when the peak frequency is predicted to change to a high-frequency side, the measurement range may be set so a frequency range on a high-frequency side of the predicted peak frequency is wide.

The learning unit 33 is provided with the same learning model LM as the learning model LM used by the computation unit 31 and updates the learning model LM had by the learning unit 33 and the learning model LM used by the computation unit 31. Specifically, the learning unit 33 performs machine learning so an error of the peak frequency predicted by the computation unit 31 is less than a predefined threshold and updates the learning model LM had by the learning unit 33. Then, the learning unit 33 reflects the updated learning model LM on the learning model LM used by the computation unit 31 to update the learning model LM used by the computation unit 31.

For example, the learning unit 33 performs machine learning using the recurrent neural network N1 illustrated in FIG. 9. When performing this machine learning, as described above, the learning unit 33 performs machine learning so the error of the peak frequency predicted by the computation unit 31 is smaller than the predefined threshold. Note that the "error of the peak frequency" is more accurately an error between the peak frequency predicted by the computation unit 31 and the peak frequency obtained by analyzing the Brillouin gain spectrum obtained after changing the measurement range based on the peak frequency predicted by the computation unit 31.

By providing the learning unit 33, the learning model LM used by the computation unit 31 can be updated even after starting operation of the optical fiber characteristic measurement device. As such, a prediction precision of the peak frequency can be increased. Note that for convenience in description, the example illustrated in FIG. 9 illustrates the computation unit 31 and the learning unit 33 as separate blocks. However, the computation unit 31 and the learning unit 33 may be consolidated as one block.

The optical fiber characteristic measurement device of one or more embodiments described below differs from the optical fiber characteristic measurement device 1 of one or more embodiments described above in changing the measurement range of the spectrum acquisition unit 17 based on the prediction result of the peak frequency. However, basic operations are the same as the optical fiber characteristic measurement device 1 of one or more embodiments described above. As such, when, for example, measuring characteristics of one measurement point set in the length direction of the optical fiber under test FUT, the same processes as the flowchart illustrated in FIG. 3 are performed. Moreover, when measuring characteristics of a plurality of different measurement points set in the length direction of the optical fiber under test FUT, the same processes as the flowchart illustrated in FIG. 6 are performed. As such, detailed description of the operations is omitted.

As above, in one or more embodiments, the peak frequency likely to be obtained next time is predicted based on the peak frequency obtained by analyzing the Brillouin gain spectrum and the measurement range of the spectrum acquisition unit 17 is changed based on this prediction result. As such, even when a change in temperature or strain affecting the optical fiber under test FUT is large, an absolute value of the temperature or strain affecting the optical fiber under test FUT can be accurately measured while being able to set the measurement range to follow the change in the peak frequency.

An optical fiber characteristic measurement device and an optical fiber characteristic measurement method according to one or more embodiments of the present invention are described above. However, the present invention is not limited to these embodiments, and changes can be made freely within the scope of the present invention. For example, the embodiments described above may be described using a BOCDR optical fiber characteristic measurement device as an example, but the present invention can also be applied to a device other than a BOCDR optical fiber characteristic measurement device. Specifically, it can be applied to a device that performs processes of acquiring a Brillouin gain spectrum, analyzing the acquired Brillouin gain spectrum, and seeking a Brillouin frequency shift. As this device, for example, a BOCDA (Brillouin optical correlation domain analysis) optical fiber characteristic measurement device and a BOTDR (Brillouin optical time domain reflectometry) optical fiber characteristic measurement device can be mentioned.

Furthermore, to simplify description of the embodiments, only one correlation peak is described as appearing in the optical fiber under test FUT. When a plurality of correlation peaks appears in the optical fiber under test FUT, it is sufficient to, for example, use a method referred to as a time-gate method to select one of the plurality of correlation peaks and extract only Brillouin scattered light at a position where the selected correlation peak appears.

Furthermore, in addition to between the first optical splitting unit 12 and the optical coupling unit 15 or between the first optical splitting unit 12 and the second optical splitting unit 13, the optical delay unit 14 may be provided between the second optical splitting unit 13 and the optical coupling unit 15. Moreover, a first amplification unit that amplifies the pump light LP may be provided between the first optical splitting unit 12 and the second optical splitting unit 13. Moreover, a second amplification unit that amplifies the Brillouin scattered light LS may be provided between the second optical splitting unit 13 and the optical coupling unit 15. Moreover, a third amplification unit that amplifies the reference light LR may be provided between the first optical splitting unit 12 and the optical coupling unit 15.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERALS

1 Optical fiber characteristic measurement device
11 Light-source unit
12 First optical splitting unit
13 Second optical splitting unit
16 Detection unit
17 Spectrum acquisition unit
18 Spectrum analysis unit
31 Computation unit
32 Setting control unit
33 Learning unit
BL1 Buffer layer
BL2 Buffer layer
FUT Optical fiber under test
L1 Continuous light
LM Learning model
LP Pump light
LR Reference light
LS Brillouin scattered light
S1 Detection signal
S2 Setting signal

What is claimed is:

1. An optical fiber characteristic measurement device, comprising:
  a detector that detects Brillouin scattered light obtained by causing light to be incident on an optical fiber under test;
  a spectrum analyzer that obtains a Brillouin gain spectrum from the Brillouin scattered light; and
  a spectrum analyzing controller that:
    measures a characteristic of the optical fiber under test by analyzing the Brillouin gain spectrum to:
      obtain a peak frequency of the Brillouin gain spectrum, and
    changes a frequency range used by the spectrum analyzer to obtain the Brillouin gain spectrum according to the peak frequency.

2. The optical fiber characteristic measurement device of claim 1, wherein the spectrum analyzing controller further:
  predicts a possible peak frequency likely to be obtained during a subsequent measurement based on the peak frequency, and
  changes the frequency range based on the possible peak frequency.

3. The optical fiber characteristic measurement device of claim 2, wherein the spectrum analyzing controller further:
  predicts the possible peak frequency using a learning model obtained by performing machine learning using data indicating change over time in the peak frequency or data indicating change over time in the Brillouin gain spectrum; and
  dynamically changes the frequency range based on the possible peak frequency.

4. The optical fiber characteristic measurement device of claim 3, wherein the spectrum analyzing controller further:
  performs the machine learning so an error between the possible peak frequency and a peak frequency obtained by analyzing the Brillouin gain spectrum after changing the frequency range possible peak frequency is smaller than a predefined threshold, and
  updates the learning model.

5. The optical fiber characteristic measurement device of claim 3, wherein the spectrum analyzing controller changes the frequency range to be asymmetrical relative to the possible peak frequency.

6. The optical fiber characteristic measurement device of claim 1, wherein the spectrum analyzing controller changes the frequency range to be narrower than a preset reference frequency range.

7. The optical fiber characteristic measurement device of claim 6, wherein the spectrum analyzing controller, after changing the frequency range to be narrower than the reference frequency range, changes the frequency range again without changing a width of the frequency range.

8. The optical fiber characteristic measurement device of claim 1, further comprising: a buffer that buffers temperature or strain transmission to the optical fiber under test.

9. The optical fiber characteristic measurement device of claim 1, further comprising:
  a light source that outputs frequency-modulated continuous light;
  a first optical splitter that splits the continuous light into pump light and reference light; and
  a second optical splitter that causes the pump light to be incident from one end of the optical fiber under test and outputs the Brillouin scattered light arising in the optical fiber under test; wherein
  the detector detects interference light between the Brillouin scattered light and the reference light.

10. An optical fiber characteristic measurement method, comprising:
  detecting Brillouin scattered light obtained by causing light to be incident on an optical fiber under test;
  obtaining a Brillouin gain spectrum from the Brillouin scattered light; and
  measuring a characteristic of the optical fiber under test by analyzing the Brillouin gain spectrum to:
    obtain a peak frequency of the Brillouin gain spectrum; and changing a frequency range used to obtain the Brillouin gain spectrum according to the peak frequency.

\* \* \* \* \*